(12) United States Patent
Cleary

(10) Patent No.: US 10,722,329 B2
(45) Date of Patent: Jul. 28, 2020

(54) LINKED CONNECTION FOR ORTHODONTIC CLASS III CORRECTION

(71) Applicant: 3M INNOVATIVE PROPERTIES COMPANY, St. Paul, MN (US)

(72) Inventor: James D. Cleary, Glendora, CA (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 15/762,116

(22) PCT Filed: Dec. 28, 2016

(86) PCT No.: PCT/US2016/068820
§ 371 (c)(1),
(2) Date: Mar. 22, 2018

(87) PCT Pub. No.: WO2017/120078
PCT Pub. Date: Jul. 13, 2017

(65) Prior Publication Data
US 2018/0280119 A1    Oct. 4, 2018

Related U.S. Application Data

(60) Provisional application No. 62/274,559, filed on Jan. 4, 2016.

(51) Int. Cl.
*A61C 7/36* (2006.01)
*A61C 7/20* (2006.01)

(52) U.S. Cl.
CPC . *A61C 7/36* (2013.01); *A61C 7/20* (2013.01)

(58) Field of Classification Search
CPC .. A61C 7/36; A61C 7/282; A61C 7/06; A61C 7/20

USPC ...................................................... 433/18–24
See application file for complete search history.

(56) References Cited

U.S. PATENT DOCUMENTS

| 4,382,783 A | 5/1983 | Rosenberg | |
| 4,472,139 A * | 9/1984 | Rosenberg | A61C 7/36 433/19 |
| 4,708,646 A | 11/1987 | Jasper | |
| 5,352,116 A | 10/1994 | West | |
| 5,435,721 A | 7/1995 | Vogt | |
| 5,562,445 A * | 10/1996 | DeVincenzo | A61C 7/36 433/18 |

(Continued)

FOREIGN PATENT DOCUMENTS

| FR | 2936701 A1 * | 4/2010 | A61C 7/282 |
| WO | WO-2009024118 A1 * | 2/2009 | A61C 7/36 |

(Continued)

OTHER PUBLICATIONS

Translation of FR2936701—translated Jun. 6, 2019 (Year: 2019).*

(Continued)

*Primary Examiner* — Cris L. Rodriguez
*Assistant Examiner* — Matthew P Saunders
(74) *Attorney, Agent, or Firm* — Kevin Weber

(57) ABSTRACT

The present disclosure provides intraoral devices for repositioning the relationship between upper and lower dental arches, particular those in a Class III relation. The devices are attached to appliances on molar teeth of each arch and can be reactivated without removal or replacement of substantial components of the device.

10 Claims, 6 Drawing Sheets

(56) References Cited

U.S. PATENT DOCUMENTS

| | | | |
|---|---|---|---|
| 5,651,672 A | 7/1997 | Cleary | |
| 5,678,990 A * | 10/1997 | Rosenberg | A61C 7/36 433/19 |
| 5,718,576 A | 2/1998 | Schnaitter | |
| 5,964,588 A * | 10/1999 | Cleary | A61C 7/36 433/18 |
| 5,980,247 A | 11/1999 | Cleary | |
| 6,027,340 A | 2/2000 | Chun | |
| 6,361,315 B1 * | 3/2002 | Hanks | A61C 7/10 433/19 |
| 6,589,051 B2 | 7/2003 | Cleary | |
| 6,616,449 B1 * | 9/2003 | Rocher | A61C 11/02 433/55 |
| 6,988,888 B2 | 1/2006 | Cleary | |
| 7,811,087 B2 | 10/2010 | Wiechmann | |
| 8,257,080 B2 | 9/2012 | Wiechmann | |
| 8,714,974 B2 | 5/2014 | Cleary | |
| 2003/0022124 A1 * | 1/2003 | Schnaitter | A61C 7/00 433/19 |
| 2008/0176185 A1 * | 7/2008 | Williams | A61C 7/36 433/140 |
| 2010/0285422 A1 * | 11/2010 | Wiechmann | A61C 7/36 433/18 |
| 2012/0028207 A1 | 2/2012 | Cleary | |
| 2012/0028208 A1 * | 2/2012 | Cleary | A61C 7/36 433/19 |
| 2012/0135365 A1 * | 5/2012 | Cleary | A61C 7/36 433/10 |
| 2014/0186788 A1 | 7/2014 | Sheibani Nia | |
| 2014/0272755 A1 * | 9/2014 | Radmall | A61C 7/34 433/14 |
| 2016/0175074 A1 * | 6/2016 | Cleary | A61C 7/36 433/19 |

FOREIGN PATENT DOCUMENTS

| | | | |
|---|---|---|---|
| WO | WO 2014130870 | 8/2014 | |
| WO | WO-2014130870 A1 * | 8/2014 | A61C 7/36 |
| WO | WO 2015-157472 | 10/2015 | |
| WO | WO 2016-105466 | 6/2016 | |

OTHER PUBLICATIONS

Translation of Pasin et al. from EPO machine translation accessed on Oct. 2019 (Year: 2019).*

International Search Report for PCT International Application No. PCT/US2016/068820, dated Mar. 13, 2017, 3 pages.

* cited by examiner

LINKED CONNECTION FOR ORTHODONTIC CLASS III CORRECTION

CROSS REFERENCE TO RELATED APPLICATIONS

This application is a national stage filing under 35 U.S.C. 371 of PCT/US2016/068820, filed Dec. 28, 2016, which claims the benefit of U.S. Provisional Application No. 62/274,559, filed Jan. 4, 2016, the disclosures of which are incorporated by reference in their entireties herein.

BACKGROUND

The field of orthodontics relates to the supervision, guidance and correction of teeth towards proper positions in the oral cavity. Orthodontic therapy generally involves the application of forces to move teeth into a proper bite configuration, or occlusion. One mode of therapy, known as fixed appliance treatment, is carried out using a set of tiny slotted appliances called brackets, which are affixed to at least the anterior, cuspid, and bicuspid teeth of a patient. In the beginning of treatment, a resilient orthodontic appliance known as an archwire is received in each of the bracket slots. The end sections of the archwire are typically anchored in appliances called buccal tubes, which are affixed to the patient's molar teeth.

When initially installed in the brackets and buccal tubes, the archwire is deflected from its original arcuate (or curved) shape, but then gradually returns to this shape during treatment. In this manner, the archwire applies gentle, therapeutic forces to move the teeth from improper positions to proper positions. Taken together, the brackets, buccal tubes, and archwire are commonly referred to as "braces". Braces are often prescribed to improve dental and facial aesthetics, bite function and dental hygiene. In many instances, a set of brackets, buccal tubes and an archwire is provided for each of the upper and lower dental arches.

Brackets and other components of the fixed appliance system are commonly placed on the labial (i.e., near the patient's lips and cheeks) surfaces of the teeth. In recent decades, advances in the art have enabled brackets to be placed on the lingual surfaces of teeth. Accordingly, the components of the fixed appliance system, including the archwire, are disposed nearer the tongue, providing an attractive, aesthetic alternative as the appliance system is essentially hidden from view. Lingual brackets often have a customized, individual design for every tooth and patient because, other than the labial surfaces of a tooth, the lingual surfaces greatly vary in shape relative to each other so that a "one size fits all" bracket shape typically cannot be used. Exemplary appliance systems that include brackets customized to the lingual surfaces of a dental arch are disclosed in U.S. Pat. No. 7,811,087 (Wiechmann et al.).

During certain stages of treatment, additional intraoral appliances may be prescribed for use in conjunction with fixed appliances to correct particular kinds of malocclusions. For example, some appliances are used to correct Class II malocclusions, such as an overbite where the mandibular first molars are located excessively distal (in the rearward direction) with respect to the maxillary first molars when the jaws are closed. Other appliances remedy an opposite malocclusion, known as a Class III malocclusion, such as an underbite where mandibular first molars are located excessively mesial (in the forward direction) with respect to the maxillary first molars when the jaws are closed.

Class II and Class III correctors have been developed that are installed by the orthodontist and require minimal patient intervention during the course of treatment. These devices advantageously correct Class II and Class III malocclusions without need for patient compliance as with prior common head gear. A number of intraoral devices for correcting Class II and Class III malocclusions are known in the art. For example, U.S. Pat. Nos. 4,708,646, 5,352,116, 5,435,721, 5,651,672, 5,964,588 and 8,257,080 describe intraoral bite correctors with flexible and/or telescoping members that are connected to upper and lower arches of a patient. A bias tends to urge the members toward a normally straight orientation and provide a force that pushes one dental arch forward or rearward relative to the other dental arch when the jaws are closed.

As the position of the jaws is corrected, that bias is reduced during jaw closure and consequently provides less force in compression. In response, the practitioner may elect to increase the effective, active length of the intraoral device to ensure that the force exerted on the patient's jaws remains effective during the course of treatment. The effective length is typically increased or otherwise modified by removing the intraoral device from the patient's mouth and then changing the components to continue treatment. Alternatively, stops or collars can be added to such devices to reduce the length of travel and increase the active force supplied.

Moreover, there are various possibilities in connecting these devices to the dental arch. Banded headgear tubes are still commonly used to provide a distal connection to the upper dental arch. These banded appliances, however, are not universally beloved. Bondable molar appliances are more convenient to use with labial systems in many respects and some orthodontists prefer them over banded appliances. As another option, connection to the dental arch may be made indirectly by coupling the intraoral device to one or both archwires.

SUMMARY

Though myriad products and solutions are well accepted for correcting Class II malocclusions, the same cannot be said for Class III malocclusions. Typical methods of Class III malocclusion are reliant on practitioner driven modification of devices designed primarily for Class II correction, and are particularly susceptible to inadvertent disassembly or severe restrictions on the patient's ability to open his or her jaws. Other methods are reliant on a combination of splints and bows to provide the necessary corrective force, and can result in substantial patient discomfort. The present disclosure provides a force module with components specifically adapted for correcting Class III malocclusions, with a deliberately low profile so as to cause minimal disruption for the patient and the practitioner.

In one aspect, the present disclosure provides an intraoral force module configured for moving the relative positions of upper and lower dental arches, the force module comprising: a first member having a first outer end portion, the first member having a length extending in a generally mesial direction when installed on the upper arch; a second member connected to the first member and coupled to a helical compression spring coaxial with at least a portion of said first member, the second member pivotally movable relative to the first member in directions along a reference axis, a portion of the second member extending distally to a second outer end portion along a portion of the length of the first member, wherein the second member is rotatable relative to a second axis generally parallel to the reference axis when the second member is coupled to an appliance on the arch.

In another aspect, the present disclosure provides an orthodontic assembly configured for moving the relative positions of upper and lower dental arches. The assembly includes an upper molar appliance having a passage, a first member having a first outer end portion received in the passage, the first member having a length extending in a generally mesial direction, and a stop coupled to the first member and disposed distal to the passage. The assembly further includes a second member pivotally connected to the first member and coupled to a helical compression spring coaxial with at least a portion of said second member, the second member pivotally movable relative to the first member in directions along a first reference axis, a portion of the second member extending distally to a second outer end portion along a portion of the length of the first member. The assembly further includes a lower molar appliance, wherein the second member is rotatably coupled to the lower molar appliance for rotation about a second axis.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an," and "the" are not intended to refer to only a singular entity, but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" unless specifically stated otherwise. As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

As used herein: "Mesial" means in a direction toward the center of the patient's curved dental arch; "Distal" means in a direction away from the center of the patient's curved dental arch; "Occlusal" means in a direction toward the outer tips of the patient's teeth; "Gingival" means in a direction toward the patient's gums or gingiva; "Facial" means in a direction toward the patient's lips or cheeks; and "Lingual" means in a direction toward the patient's tongue.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

While the above-identified figures set forth several embodiments of the disclosure other embodiments are also contemplated, as noted in the description. In all cases, this disclosure presents an invention by way of representation and not limitation. It should be understood that numerous other modifications and embodiments can be devised by those skilled in the art, which fall within the scope and spirit of the principles of the inventions.

DETAILED DESCRIPTION OF EXEMPLARY EMBODIMENTS

Figure 1:
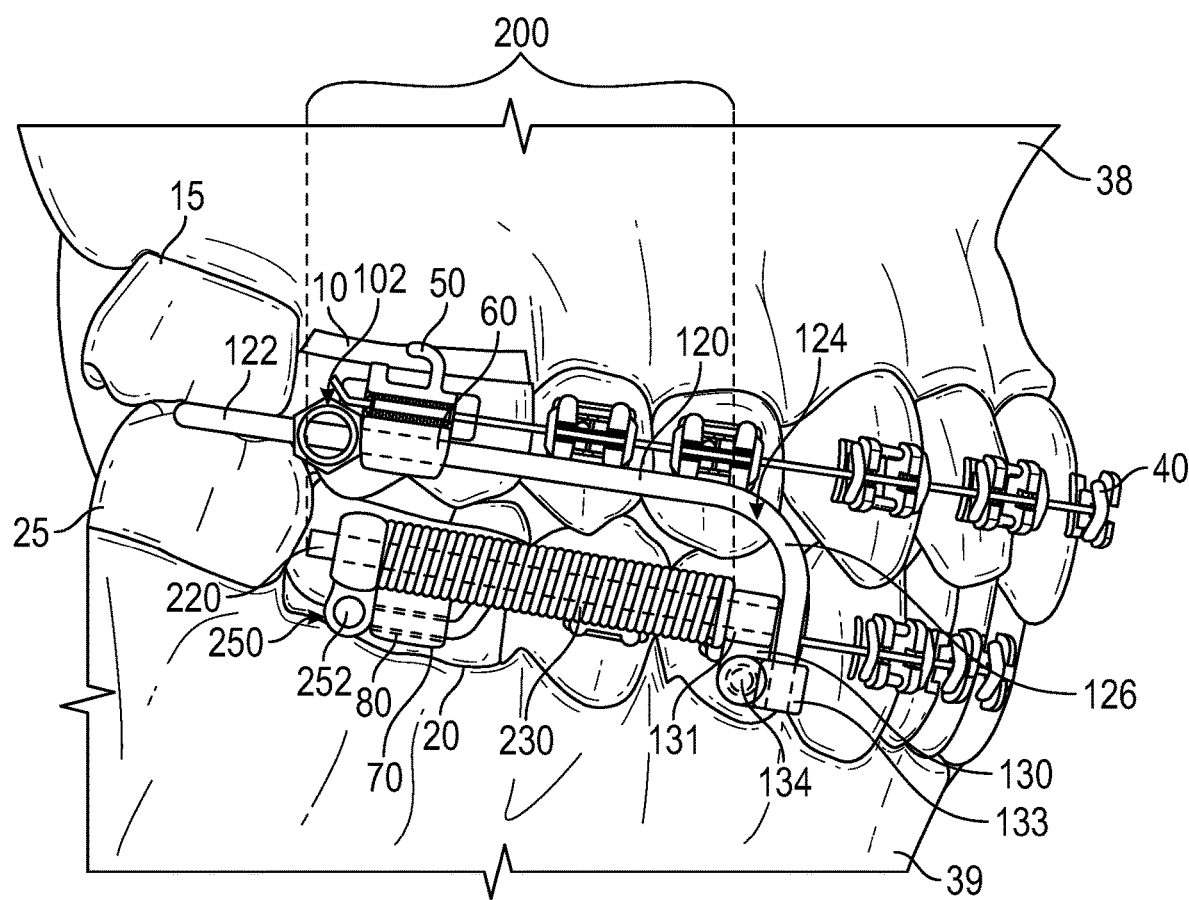
FIG. 1 is a side elevational view of a force module including both an upper module and a lower module according to an embodiment of the disclosure.
Figure 4:
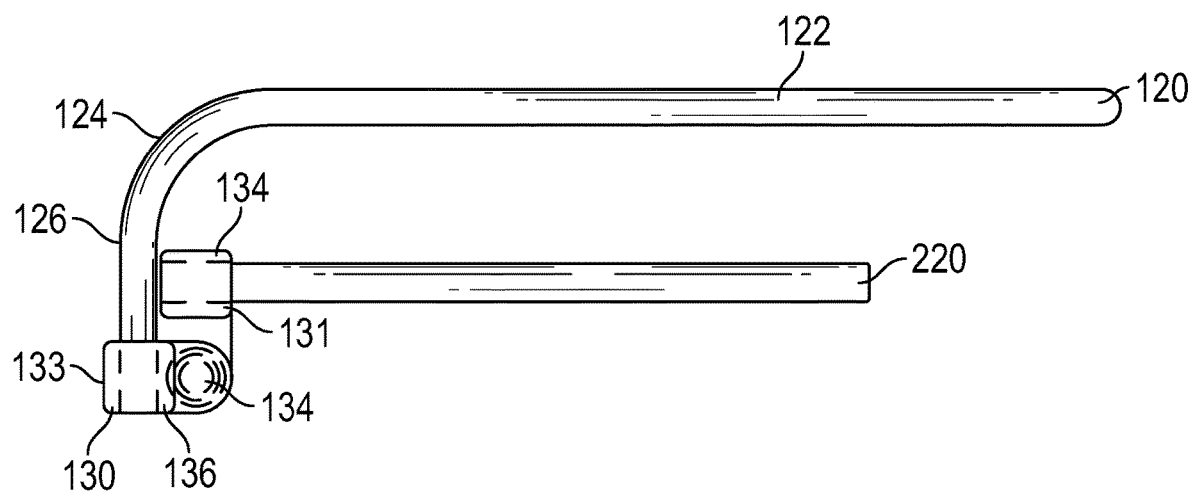
FIG. 4 is a side elevational view of the upper arm, second member and pivot link of the force module of FIGS. 1-3.

An exemplary embodiment of an intraoral appliance system is shown in FIGS. 1 and 4. These figures depict an orthodontic assembly, which is designated herein by the numeral 100, coupled to a set of labial brackets. One skilled in the art will recognize that assembly 100 can also be coupled to a set of lingual brackets. The assembly 100 is installed on the right side of the upper and lower jaws (38, 39) of a patient, which are illustrated in profile view. The assembly may also be attached to the left side of the upper and lower jaws (38, 39) with reflective modification. As shown, the teeth of the upper jaw 38 include an upper central, upper lateral incisor, upper cuspid, upper first bicuspid, upper second bicuspid, upper first molar 10, and upper second molar 15. Similarly, the teeth of the lower jaw include a lower central, lower lateral, lower cuspid, lower first bicuspid, lower second bicuspid, lower first molar 20 and lower second molar 25.

A number of slotted orthodontic appliances (i.e., brackets) 40 are fixed to the teeth of the patient's upper jaw 38 and an archwire is received in the archwire slot of each appliance. An elastomeric O-ring ligature extends around tiewings of each bracket in order to retain the archwire in the archwire slots of the brackets. Similarly, a number of slotted orthodontic brackets are fixed to the teeth of the patient's lower jaw 39. An archwire is received in the slot of each such bracket. An elastomeric O-ring ligature extends around the tiewings of each bracket in order to retain the archwire in the archwire slots of the brackets. In this example, both upper and lower archwires have generally rectangular cross-sections in planes perpendicular to their longitudinal axes. Other archwire configurations, including ovular and circular cross-sections, are also possible.

The right distal ends of the upper and lower archwires are received in an archwire slot of molar appliances 50, 70, respectively. Optionally, an end section of the archwire is bent as shown in FIGS. 1 and 4 in a location adjacent the distal side of the molar appliance 50, 70. Each bracket and molar appliance includes a base or other surface for bonding the appliance to the facial surface of its respective tooth.

In the illustrated example, the base of the molar appliance is affixed to a band. The band encircles the patient's upper right first molar tooth 10 and is connected to the upper molar appliance 50 by a weld or a braze joint. Optionally, the upper molar appliance 50 may be connected to the molar tooth 10 by other means such as an adhesive bond between the base and the enamel surface of the molar tooth 10. The upper molar appliance 50 has a body that extends outwardly from the base in a generally facial direction and includes an archwire slot 58. As depicted, the appliance 50 is a convertible appliance with a section of material covering a buccal opening of the archwire slot. The body includes a passage 60 adjacent the archwire slot 58. In certain implementations further described herein, the passage 60 is used in coupling a force module to the upper molar appliance 50. In embodiments featuring a patient with lingual braces, the molar tube appliance need only include a base and tubular passage; the archwire slot will be unnecessary. The lower molar appliance 70 may include some or all of the same features as the upper molar appliance 50 (including convertibility), but will typically include a base, body, archwire slot, and passage.

The assembly 100 includes a combination of elements that cooperate in applying a therapeutic force between the upper and lower dental arches. The orthodontic assembly 100 includes a force module 110 configured for Class III correction. The force module 110 includes an upper arm 120 and a lower module 200. In the illustrated embodiment, the lower module 200 features a telescoping assembly. Aspects of the telescoping assembly, along with alternative constructions and methods of use, are set out in, for example, U.S. Pat. Nos. 5,964,588 and 6,988,888 (Cleary). As depicted in FIGS. 1 and 4, the upper arm 120 is received in the passage 60 in the upper molar appliance 50. On opposite arch, the lower module 200 is rotatably coupled to the lower molar appliance 70.

The upper arm 120 includes a distal end segment 122 and a mesially extending segment 124, which culminates in coupling segment 126. The upper arm 120 in this embodiment comprises a solid, generally cylindrical rod. A portion of the distal segment 122 is received in the passage 60 of the upper molar appliance 50. Mesial movement of the arm 120 is limited by a stop 102 secured to the distal segment 122 and positioned distal to the passage 60. The stop 102 helps define the effective length 126 of the upper arm 120, essentially a length of the upper arm 120 from the mesial edge of the upper molar appliance 50 to the coupling segment 126. In the depicted embodiment, the distal segment is 122 secured in relative position by a Gurin lock 102, however other stop configurations are possible. Gurin locks are known devices and, accordingly, are not described in detail here. In summary, the Gurin lock 102 includes a cylindrical member with an aperture and the distal segment extends through the aperture. A set screw extends through the cylindrical member to the aperture, which can be tightened to lock the stop in a desired location on the upper arm 120. Accordingly, by adjusting the distal segment 122 forwardly or rearwardly relative to the passage 60 and arresting with stop 102, the effective length of the upper arm 120 can be reduced or increased as desired the user. Excess upper arm length distal to the stop 102 can be trimmed off by the user, or can be retained for repositioning of the module at a later stage of treatment.

Figure 2:
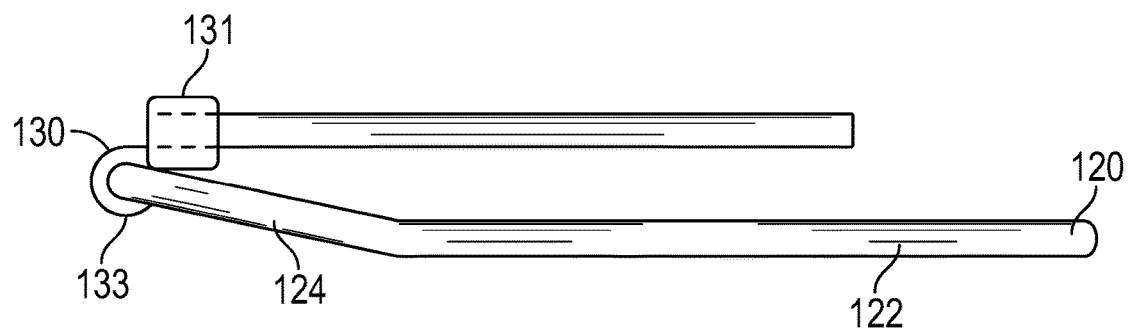
FIG. 2 is a view of the upper arm and second member of the assembly of FIG. 1, looking in a gingival direction towards the lower arch.

As shown for example in FIG. 2, the longitudinal axis of the distal segment 122 extends at an angle relative to the longitudinal axis of the mesial segment 124 when viewed in directions perpendicular to an occlusal reference plane. The angle allows for closer approximation of the curvature of the patient's upper dental arch, reducing the profile of the upper arm 120 relative to the patient's cheeks. As an example, if the overall length of the distal segment is about 2.29 cm (0.9 inch), the angle is about 12°. However, and as can be appreciated by reference to FIG. 3, the longitudinal axis of the distal segment 122 and the longitudinal axis of the mesial segment 124 generally extend in a common reference plane that is generally parallel to an occlusal reference plane.

Figure 3:
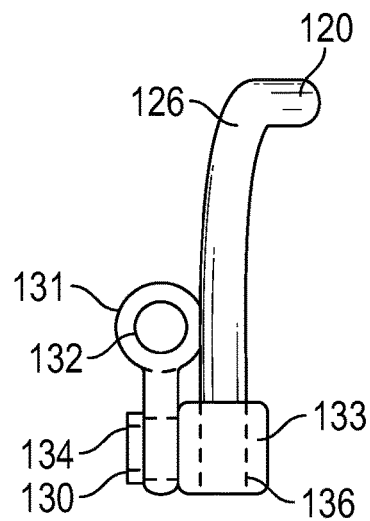
FIG. 3 is a mesial end view of a pivot link as depicted in FIGS. 1 and 2.

The occlusal coupling segment 126 extends at a non-zero angle relative to the longitudinal axis of the mesial segment 124 when viewed in directions parallel to an occlusal reference plane as depicted in FIGS. 3 and 4. Preferably, this angle is in the range of about 70° to about 110°, and more preferably is about 90°. The coupling segment 126 normally extends in an occlusal direction as shown for example in FIG. 1 when the force module 110 is connected in place to the upper and lower arches.

The outer end of the coupling segment 126 is secured in a pivot link 130 best illustrated in FIG. 3, which includes an upper segment 131 including a mesial-distal extending passage 132 and a lower segment 133 including an occlusal-gingival passage 136. A hinge 134 is disposed between the segments 131, 133 and has an axis of rotation extending in a generally facial-lingual direction (i.e., generally perpendicular to the distal segment 122). In the depicted embodiments, the coupling segment 126 remains essentially fixed relative to recess 136 during use of the device 110. As can be seen in FIG. 3, The lower segments 133 is offset on a facial-lingual axis from the hinge 134, while the upper segment 131 is offset on an occlusal gingival direction. Accordingly, the upper segment 131 and recess 132 are disposed in a generally occlusal direction from the lower segment 133 and recess 136, giving the pivot link a generally L-shaped appearance when viewed along the hinge axis. The hinge 134 may be created by a rivet, pin, or like structure 138 that extends through a portion of upper and lower pivot segments 131, 133. As another example, the hinge 134 may comprise a machine screw and threaded nut which optionally may be disconnected for separation of the arm 120 and module 200 as desired. Other types of pivots and hinges may also be employed to ensure the appropriate connection and rotation.

In certain implementations, the coupling segment 126 is permanently secured in the passage 136 via adhesive, soldering composition, or the like. In other implementations, the coupling segment 136 is removably secured to the pivot link 130, such that the coupling segment 126 can be replaced or modified as desired during treatment. A removable connection between the coupling segment and the passage 136 can allow a treating practitioner to change the activation length of the force module 110 as desired.

Figure 5:
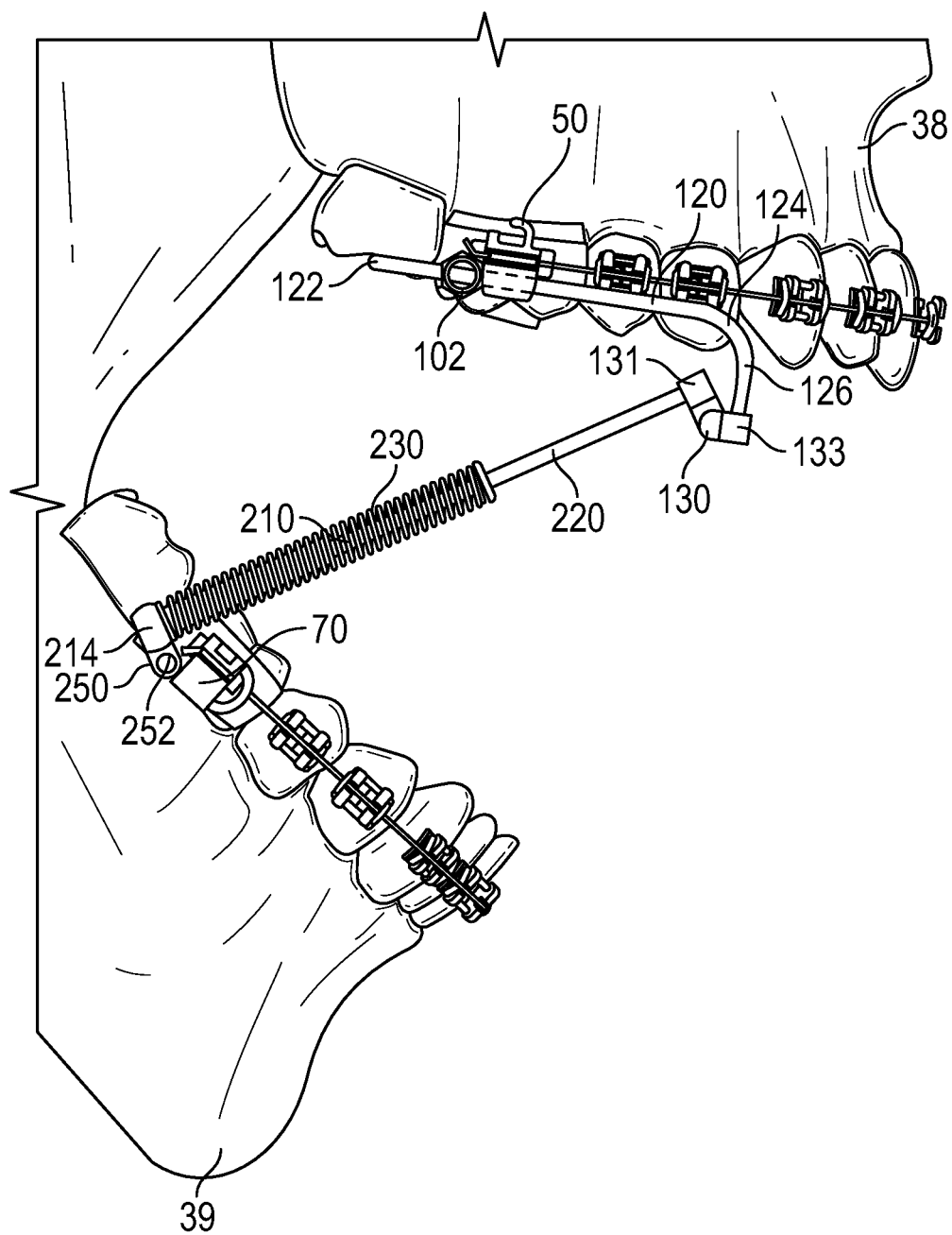
FIG. 5 is a view somewhat similar to FIG. 1 except that the patient's jaws have been fully opened.

Turning again to FIGS. 1 and 5, the lower module 200 includes a hollow first member 210 having a tubular, elongated shape. An outer end portion of the first member 210 includes an end cap 214 with an outwardly extending tab that has a circular opening to enable connection of the lower module 200 to the lower appliance 70. The lower module 200 also includes a second member 220 received at least partially in the first member 210. The second member 220 in this embodiment includes a solid, cylindrical rod extending in a generally mesial direction towards an outer end segment or coupling portion 222. The second member 220 is movable relative to the first member 210 from a fully compressed position and to an extended position as shown in FIG. 5. In certain embodiments, the second member 220 can include one or more collars that are fixed in place relative to the outer end segment 222. The collar can limit the extent of movement of the second member 220 in directions toward both the end cap 214 and the central pivot link 130.

With reference again to FIG. 5, the lower module 200 can optionally include a sleeve (not shown) that is preferably made of a cylindrical section of tubular material. The sleeve is partially received in the first member 210 in sliding, telescoping relation. The sleeve has an inner, enlarged end portion with an outer diameter that is larger than the outer diameter of the remaining extent of the sleeve. This inner end portion of the sleeve has an outer diameter that is larger than the inner diameter of the mesial end portion of the first member 210 remote from the end cap 214. As such, the inner end portion of the sleeve functions as a stop to limit outward movement of the sleeve relative to the first member 210 and also to prevent separation of the sleeve from the first member 210.

The lower module 200 further includes a helical compression spring 230 that extends externally around the first member 210 and the optional sleeve. An outer end of the spring 230 bears against the end cap 214 and an opposite end of the spring 230 is received in a circular recess of an annular fitting that is fixed to an outer end portion of the sleeve, if used, or the first member 210. The spring 230 is illustrated in its nearly fully compressed position in FIG. 1 and in its relaxed and extended position in FIG. 5.

The second member 220 is partially received in the sleeve and is movable in telescopic fashion in a longitudinal direction along the central, longitudinal axis of the sleeve and first member 210. In certain embodiments, the second member 220 has an outer diameter that is slightly smaller than the inner diameter of the sleeve in order to allow the second member 220 to slide freely in the sleeve. In presently preferred implementations, the adjacent end of the second member 220 is flush with the outer end of the first member 210 adjacent the end cap 214 when the force module 110 is nearly fully compressed as shown in FIG. 1 so that the second member 220 can function to push food debris or the like out of the end cap 214. In other alternative embodiments, the second member 220 can be fixedly received in first member 210 and sleeve, as sliding movement is not always necessary to allow the patient to fully open his or her jaws.

The second member 220 also serves to connect the lower module 200 to the central pivot 130, as it is fixedly received in recess 132. This positions the second member 220 closer to the upper arch than the connection point between the pivot 130 and the coupling segment 126 of upper arm 120, despite the lower module 200 resting adjacent the occlusal surfaces of the lower arch when the patient's jaws are closed.

The lower module is coupled to a lower molar appliance 70 via end cap 214, which allows for controlled rotation of the lower module relative to the patient's lower arch. The end cap 214 has gingivally extending coupling segment 250 with an opening that receives a pin 252 with an enlarged head on one end. The pin 252 is pivotally movable in the opening and enables pivotal movement of the lower module 200 relative to the lower molar appliance 70 in an arc about a facial-lingual reference axis. The pin 252 includes a shank that is bent to an angle of approximately 90 degrees, and the shank extends through a passage 80 of the lower molar appliance 70. An outer end of the pin 252 remote from the head is bent in an arc in order to secure the pin 252 to the lower molar appliance 70. As depicted in FIG. 1, the outer end of the pin 252 can be bent in an arc having a "U"-shaped configuration. However, other types of coupling, such as links, wire loops, and attachment devices such as those set out in U.S. Pat. No. 8,714,974 (Cleary), may be used in place of the pin 252.

The spring constant of the spring 230 is selected so that the spring 230 applies a certain amount of force when fully compressed (i.e., when the patient's jaws 38, 39 are closed and the upper arm 120 and lower module 200 are generally parallel to the occlusal plane). An example of a suitable spring is a spring that exerts a tensile force of approximately 0.5 lbs (0.2 kg) when fully compressed. However, springs that are stronger or weaker may also be employed in accordance with the particular treatment program and/or the particular orthodontic appliances and other components selected by the practitioner.

As shown in FIG. 1, the force module 110 is in its nearly fully compressed configuration when the patient's jaws are closed. In this nearly fully compressed configuration, the upper arm 120 and lower module 200 are generally parallel to the occlusal plane of the patient and the spring 230 is almost but not fully compressed. The inherent bias of the spring 230 provides the desired corrective forces by urging the lower molar appliance 70 in a direction toward the end cap 214, with the result that the lower jaw tends to shift in a backward direction relative to the upper jaw. As the patient's jaws are opened as in FIG. 5, the upper arm 120 rotates relative to pivot link 130, and the lower module 200 rotates relative to lower molar appliance 70 at pin 252. Assuming the second member 220 has reached the end of its permissible travel, the conn and pivot link 130 will serve to prevent or at least dissuade the patient from further opening the jaws.

Over a period of time, the force module 110 shifts the jaws toward a permanent Class I relationship. As the position of the jaws is corrected, the spring 230 is not compressed as far during jaw closure and consequently provides less force in compression. In response, the practitioner may elect to increase the effective, active length of the force module 110 to ensure that the force exerted on the patient's jaws remains effective. The effective length (and accordingly active and/or repositioning force) may be increased (or decreased if desired) by removing the force module 110 from the patient's mouth and then changing the second member 220 or the spring 230. Alternatively, the practitioner can crimp on one or more stop collars to the second member 220 adjacent the pivot link 130, so that the second member 220 does not slide as far into first member 210 when the patient's jaws are closed. Suitable stop members may be found, for example, in U.S. Pat. No. 6,589,051 (Cleary), though other configurations are possible.

Figure 6:
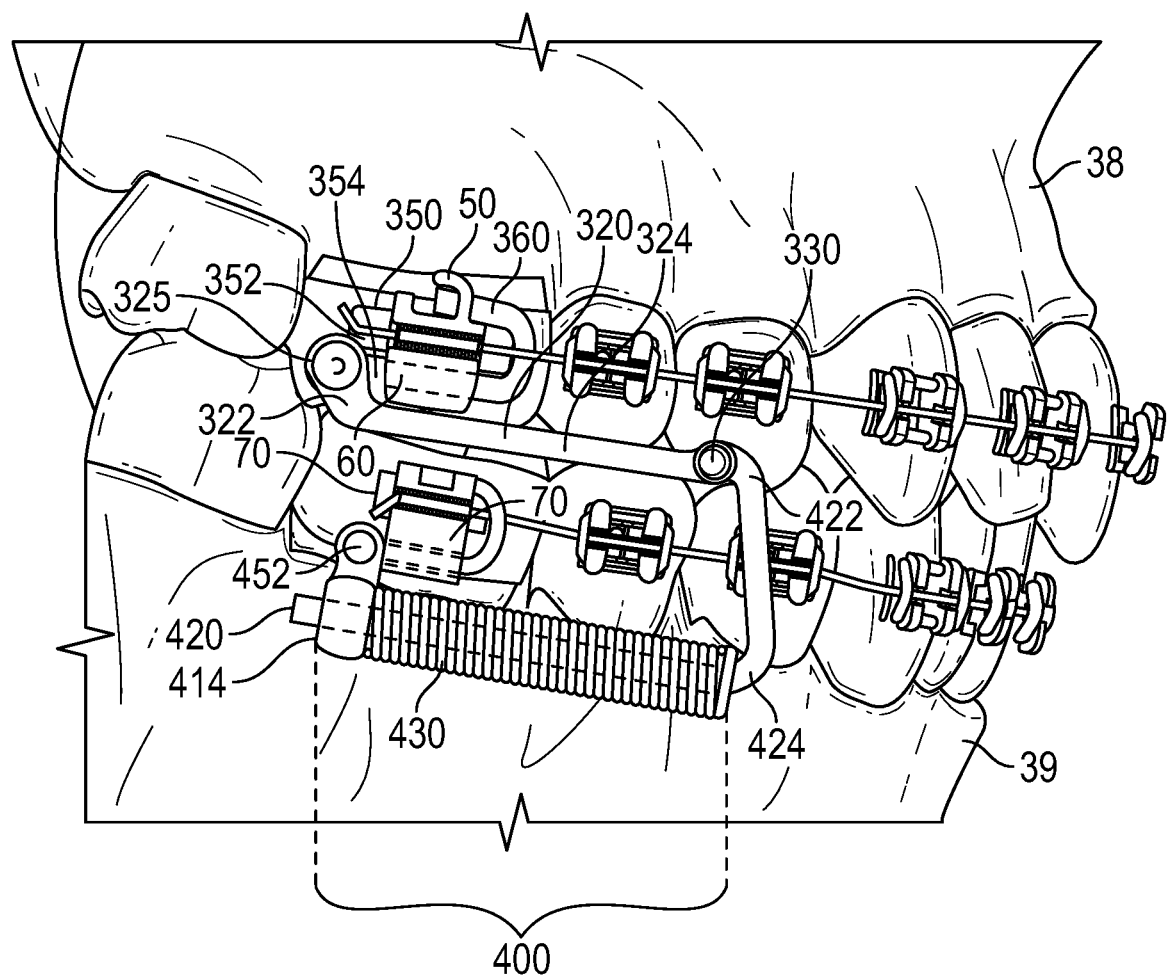
FIG. 6 is a side elevational view of a force module including both a link and a lower module according to another embodiment of the disclosure.
Figure 7:
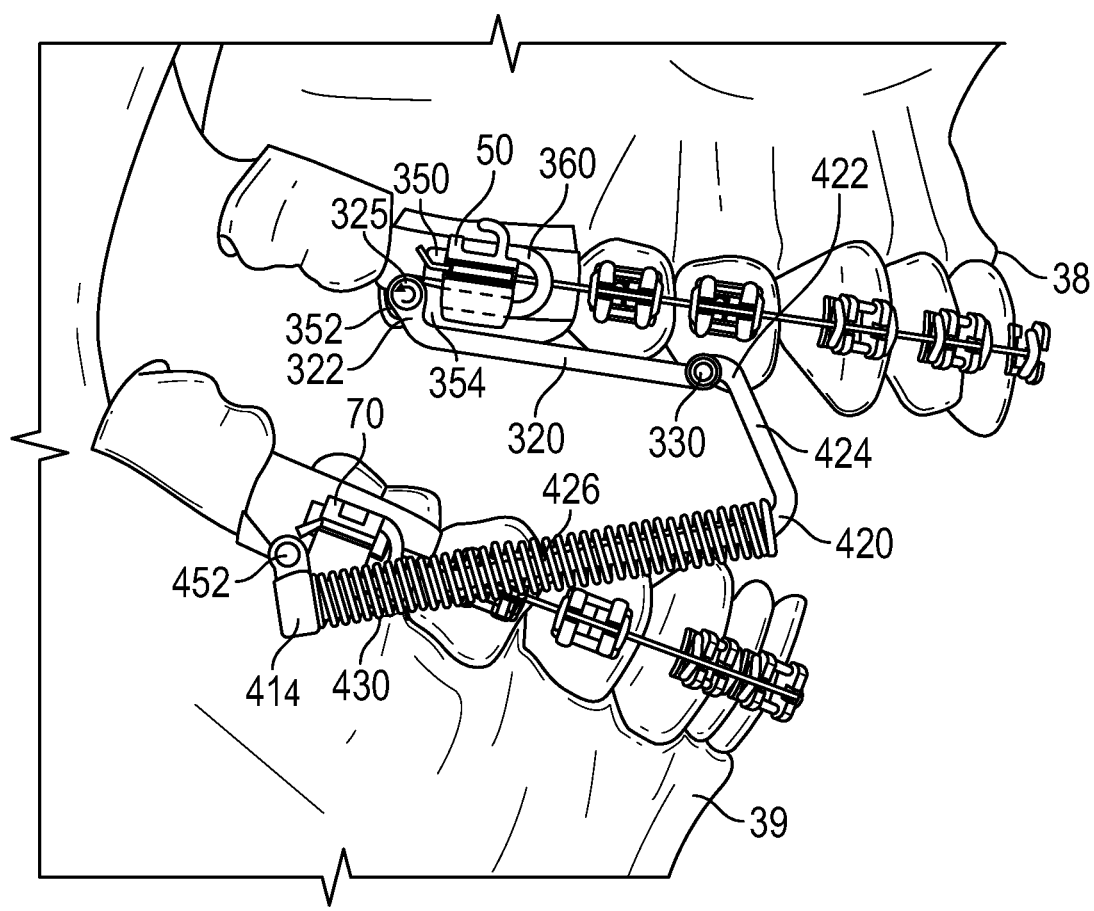
FIG. 7 is a view somewhat similar to FIG. 5 except that the lower jaw and lower jaws have been partially opened.
Figure 8:
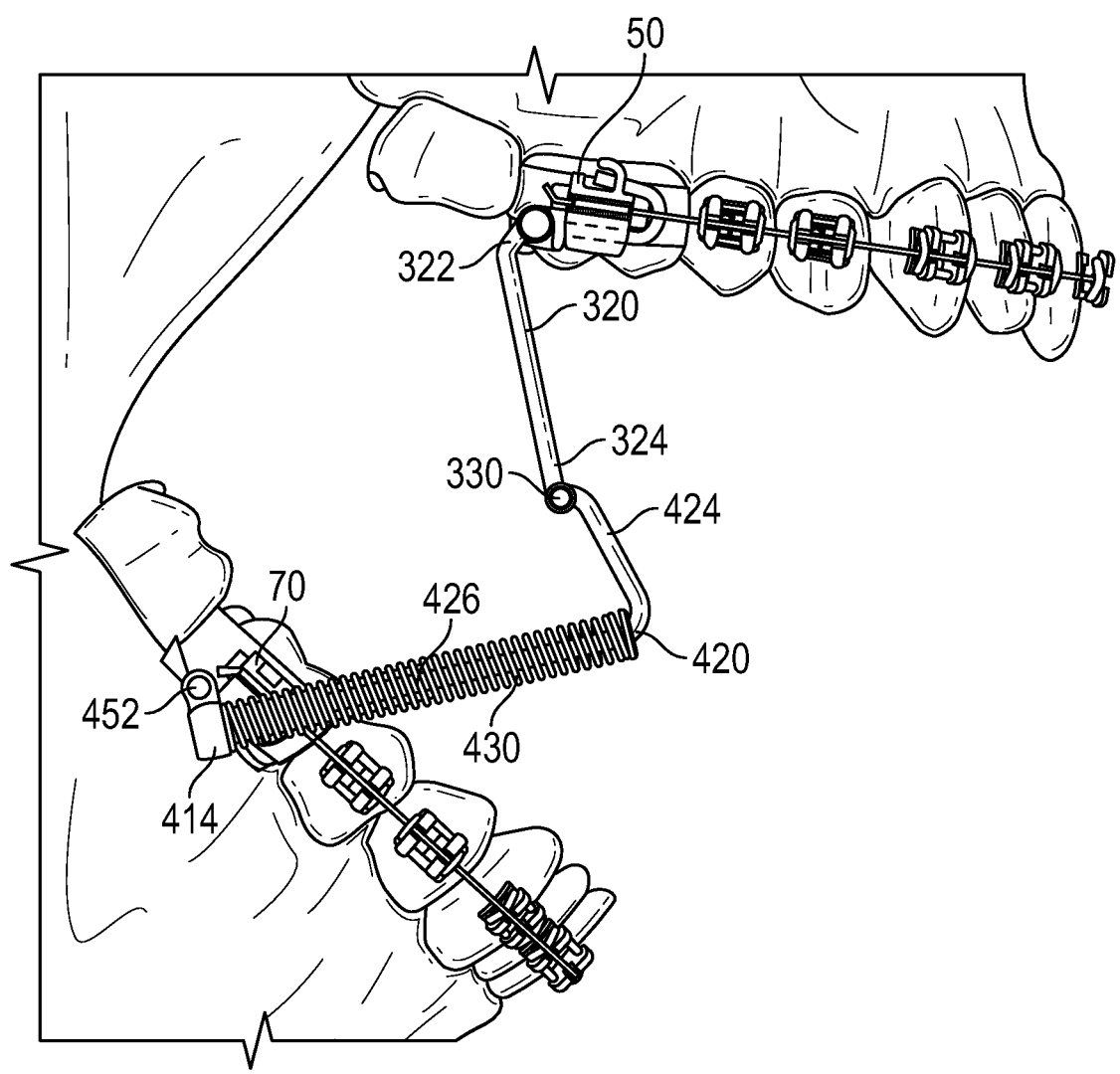
FIG. 8 is a view somewhat similar to FIGS. 6 and 7 except that the patient's jaws have been fully opened.

Another orthodontic assembly 300 including a force module 310 coupled to upper and lower molar appliances is depicted in FIGS. 6-8. The force module 310 includes an upper link 320, having a mesial end portion 322 and a distal end portion 324 featuring an opening 325. A pivot 330 connects the mesial end portion 322 of the upper link 320 to a mesial end portion 422 of a lower spring module 400. The lower spring module 400 and pin 452 are essentially identical to the lower module 200 and pin 252 described above, except for certain aspects of a second member 420. Those skilled in the art will accordingly perceive that functional elements of lower module 200 apply mutatis mutandis to lower module 400, and need not be repeated at length here.

An upper pivotal connector 350 is pivotally coupled to the distal end portion 322 of the upper link 320. The upper pivotal connector 350 includes a pivot body 352 and a pin 360. The body 352 includes a mesiodistally extending passage that is coaxial with opening 325 on the distal end portion 322. The pin 360 extends through the opening 325 and the mesiodistally extending passage in the body 352, and includes a head that cover facial surfaces of the distal end portion 322. The pin 360 includes a shank that is bent to an angle of approximately 90 degrees, and the shank extends through a passage 60 of the upper molar appliance 50. An outer end of the pin 360 remote from the head is bent in an arc in order to secure the pin 360 to the upper molar appliance 50. As depicted in FIGS. 6-8, the outer end of the pin 360 can be bent in an arc having a "U"-shaped configuration. The body 352 may further include a stop 354 to limit or impede excess rotation of the upper link 320 as the jaws 38, 39 are opened and closed.

The mesial outer end 324 of upper link 320 is pivotally connected to a mesial outer end 422 of a second member 420 by a central pivot 330. A hinge 334 is created in the central pivot 330 and has an axis of rotation extending in a generally facial-lingual direction (i.e., generally perpendicular to the longitudinal axis of upper link 320). The hinge 334 may be created by a rivet, pin, or like structure that extends through aligned openings on the corresponding mesial outer ends 322, 422. As another example, the hinge 334 may comprise a machine screw and threaded nut which optionally may be disconnected for separation of the upper link 312 and lower module 400 as desired. Other types of pivots and hinges may also be employed, including those set forth in U.S. Pat. No. 5,980,427 (Cleary).

The mesial outer 422 is disposed on an offset section 424 of the second member 420, which unlike the mesial portion of second member 220, curves toward the patient's upper arch. The offset section 422 can reduce the likelihood of pinching soft tissue of the patient's cheeks as the jaws are closed. The offset section 422 functions to increase the angle between the mesial portions of the upper link 320 and lower module 400 in order to avoid a scissors-like effect of the links in areas near the pivot 330. The offset section 424 extends at a non-zero angle relative to the longitudinal axis of the distal portion 426 of the second member 420 when viewed in directions parallel to an occlusal reference plane, as in FIGS. 6-8. Typically, this angle is in the range of about 50° to about 95°, and is some embodiments is in the range of about 60° to about 80°.

As shown in FIG. 6, the offset section 422 is arranged to sustain the pivot link 330 in a position between the brackets mounted on the patient's upper dental arch and the patient's lower dental arch when the patient's jaws are closed, and more preferably sustain the pivot 330 in a position lying in or very near the occlusal plane of the patient. Such construction can be an advantage in that the pivot 330 is unlikely to impinge the patient's oral tissues when the assembly 300 is in use, and particularly is unlikely to impinge the patient's gingiva (i.e., the gums). Location of the pivot 330 in or near the occlusal plane during closure of the jaws also tends to apply the substantial majority of the corrective forces to both of the jaws in a direction closely parallel to the occlusal plane, which without wishing to be bound by theory is thought to improve the effectiveness of the assembly 300 during treatment.

As again shown in FIG. 6, the force module 310 is in its nearly fully compressed configuration when the patient's jaws are closed. In this nearly fully compressed configuration, the upper link 320 and lower module 400 are generally parallel to the occlusal plane of the patient and the spring 430 is almost but not fully compressed. The inherent bias of the spring 430 provides the desired corrective forces by urging the lower arch in a distal direction toward the end cap 414 and by urging the upper link 320 is a mesial direction, with the result that the lower jaw tends to shift in a backward direction relative to the upper jaw.

As the patient's jaws are opened, the upper link 320 pivots relative to lower module 400 at pivot link 330, and the spring 430 begins to urge the first member 410 and second member 420 in opposite directions. In the partially opened stage depicted in FIG. 7, the spring 430 has reached the end of its active range and is no longer fully compressed. The lower module 400 has been rotated at connector 450 in a direction towards the upper jaw 38 relative to lower molar appliance 70. In contrast, the upper link 320 remains generally parallel to the occlusal plane of the lower arch. As the jaws are opened yet wider as shown in FIG. 8, the upper link 320 rotates in direction toward the lower jaw 39 relative to upper molar appliance 50. The assembly 300 thus incorporates three pivot points, allowing patient a near full range of jaw motion.

Components of the assemblies 100 and 300 may be manufactured according to any number of methods known to the skilled artisan. These methods include, but are not limited to, milling, investment casting, metal injection molding, and rapid prototyping. In presently preferred circumstances, all of the elements of the force modules and repositioning devices (including connectors, rotatable or otherwise) of the present disclosure are made of corrosion resistant materials that provide satisfactory service in the oral environment. Suitable materials include, for example, stainless steels such as AISI 300 series types (including 302 or 304), although other materials may also be employed, such as ceramics, polymers, or composites. If polymeric components are used, these may optionally be formed by milling, injection molding, extrusion or additive manufacturing. Examples of suitable additive manufacturing processes include solid freeform fabrication such as 3D printing processes, stereolithography methods, fused deposition modeling, laminated object manufacturing, laser engineered net shaping, selective laser sintering, shape deposition manufacturing, selective laser melting, and solid ground curing. An example of a suitable 3D printing machine is the Eden brand 500V printer from Objet Geometries Ltd., using FullCure 720 acrylic-based photopolymer printing material (also available from Objet Geometries Ltd.).

Although not shown in the drawings, the force modules, repositioning devices, and attendant orthodontic assemblies described herein are normally used in pairs. While the figures depict the orthodontic assemblies in place along the right side of a patient's oral cavity, a second assembly that is similar to the depicted orthodontic assemblies in mirror image is typically installed along the left side of the patient's oral cavity. In this manner, a balanced amount of force is presented along both sides of the patient's jaws for repositioning the dental arches as desired.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

I claim:

1. An intraoral force module configured for moving the relative positions of upper and lower dental arches, the force module comprising: an upper module including a first member having a first outer end portion, wherein the first member is a rod, the rod including a distal segment and a mesial segment, with the mesial segment having a length extending in a generally mesial direction when installed on the upper arch;
   a lower module including a second member pivotally connected to the first member at a link mesial to the second member and coupled to a helical compression spring coaxial with at least a portion of said second member, the second member pivotally movable relative to the first member in directions along a first facial-lingual reference axis, a portion of the second member extending distally in the direction of the distal segment of the upper module to a second outer end portion along a portion of the length of the first member, wherein the second member is rotatable in an arc about a single fixed second axis generally parallel to the reference axis when the second member is coupled at the second outer end portion to an appliance on the arch,
   wherein the mesial segment includes a coupling portion of the rod bending downward towards the lower arch when the force module is installed, the coupling portion extending towards the lower arch at an angle of 70 degrees to 110 degrees relative to the longitudinal axis of the mesial segment when viewed in directions parallel to the occlusal reference plane,
   wherein the link is a central pivot link, the pivot link including a first segment including a first passage receiving the coupling portion of the first member, and a second segment including a second passage receiving the second member, and a hinge coupling, and configured to enable pivotal movement of, the first and second segments, the module configured such that the second passage is disposed between the helical spring and the coupling portion when the force module is installed, and the upper and lower arches are closed.

2. An intraoral force module of claim 1, wherein the distal segment extends at an angle relative to a longitudinal axis of the mesial segment when viewed in directions perpendicular to an occlusal reference plane.

3. The intraoral force module of claim 2, wherein the coupling portion extending at an angle of 90 degrees relative to the longitudinal axis of the mesial segment when viewed in directions parallel to the occlusal reference plane.

4. The intraoral force module of claim 1, wherein the first segment is offset from the first member and the second passage on a facial-lingual axis.

5. The intraoral force module of claim 4, wherein, when the force module is installed and the upper and lower arches are closed, the first passage includes a longitudinal axis extending in a generally occlusal gingival direction, and wherein the second passage includes a longitudinal axis extending in a generally mesiodistal direction and is located nearer the upper arch than the first passage.

6. The intraoral force module of claim 1, wherein the central pivot link is generally L-shaped and configured to be located in a mesial direction from the lower module and the distal segment of the rod, and wherein, when the force module is installed and the upper and lower arches are closed, the first passage extends along a generally occlusal gingival axis, and wherein the second passage extends along a generally mesiodistal axis and is located nearer the upper arch than the first passage and is offset from the first passage on a facial-lingual axis.

7. The intraoral force module of claim 4, wherein the central pivot link is generally L-shaped.

8. The intraoral force module of claim 4, wherein, when the force module is installed and the upper and lower arches are closed, the first passage extends along a generally occlusal gingival axis, and wherein the second passage extends along a generally mesiodistal axis and is located nearer the upper arch than the first passage.

9. The intraoral force module of claim 1, wherein at least one of the first member and the second member is a cylindrical rod.

10. The intraoral force module of claim 1, wherein the coupling portion remains fixed in the first passage after installation of the module.

* * * * *